(12) United States Patent
Lee

(10) Patent No.: US 12,473,775 B2
(45) Date of Patent: Nov. 18, 2025

(54) INDOOR ENVIRONMENT CONTROL SYSTEM USING SMART WINDOW

(71) Applicant: Gooil Solution Co., Gyeongsangbuk-do (KR)

(72) Inventor: Jae Yeol Lee, Daegu (KR)

(73) Assignee: GOOIL SOLUTION CO., Gyeongsangbuk-do (KR)

( * ) Notice: Subject to any disclaimer, the term of this patent is extended or adjusted under 35 U.S.C. 154(b) by 399 days.

(21) Appl. No.: 18/065,701

(22) Filed: Dec. 14, 2022

(65) Prior Publication Data
US 2023/0111626 A1 Apr. 13, 2023

Related U.S. Application Data

(63) Continuation of application No. PCT/KR2021/007460, filed on Jun. 15, 2021.

(30) Foreign Application Priority Data

Jun. 17, 2020 (KR) .......................... 10-2020-0073667

(51) Int. Cl.
G02F 1/163 (2006.01)
E06B 3/67 (2006.01)
E06B 9/24 (2006.01)

(52) U.S. Cl.
CPC .............. E06B 3/6722 (2013.01); E06B 9/24 (2013.01); G02F 1/163 (2013.01); E06B 2009/2464 (2013.01)

(58) Field of Classification Search
CPC ....................................................... G02F 1/163
See application file for complete search history.

(56) References Cited

U.S. PATENT DOCUMENTS

2014/0236323 A1 8/2014 Brown et al.
2020/0260556 A1* 8/2020 Rozbicki ............. F21V 23/0464

FOREIGN PATENT DOCUMENTS

JP 2019-085871 A 6/2019
KR 10-2009-0106149 A 10/2009
(Continued)

OTHER PUBLICATIONS

International Search Report for corresponding International Application No. PCT/KR2021/074601 mailed Sep. 24, 2021.
(Continued)

Primary Examiner — Joseph P Martinez
(74) Attorney, Agent, or Firm — Eschweiler & Potashnik, LLC

(57) ABSTRACT

An indoor environment control system using smart windows includes at least two smart windows of which colors change in accordance with the intensity of supplied voltages, an internal illuminance sensor disposed inside each of the smart windows and configured to measure internal illuminance, an external illuminance sensor disposed outside each of the smart windows and configured to measure external illuminance, a main controller configured to calculate transmittance of each of the smart windows using internal illuminance and external illuminance provided from the internal illuminance sensor and the external illuminance sensor, and to calculate the intensity of a voltage that is supplied to each of the smart windows such that a difference of the calculated transmittances is a setting value (N) or less, and unit controllers configured to supply the voltages having the intensity supplied from the main controller to the smart windows, respectively.

5 Claims, 5 Drawing Sheets

(56) References Cited

FOREIGN PATENT DOCUMENTS

| | | | |
|---|---|---|---|
| KR | 10-2009-0125351 | A | 12/2009 |
| KR | 10-2018-0129384 | A | 12/2018 |
| KR | 2019-0058789 | A | 5/2019 |
| KR | 10-2016862 | B1 | 8/2019 |
| KR | 10-2114895 | B1 | 5/2020 |

OTHER PUBLICATIONS

Written Opinion for corresponding International Application No. PCT/KR2021/0074601 dated Sep. 24, 2021.

* cited by examiner

INDOOR ENVIRONMENT CONTROL SYSTEM USING SMART WINDOW

TECHNICAL FIELD

The present disclosure relates to an indoor environment control system using a smart window and, in more detail, to a system for controlling an indoor environment by matching different characteristics of smart windows.

This project was performed in 2020 under operating expense support for New Electronic Industry Development by Gumi Electronics & Information Research Institute (New Electronic Industry-AI320016A).

BACKGROUND

Recently, it is intended in the field of glass to produce materials having a higher quality by changing the characteristics of existing glasses on the basis of energy reduction effect and the use of eco-friendly materials. Further, as it is required to manufacture glass that can artificially adjust transmissivity for visible light, advanced-material glass called a smart window is being spotlighted.

A smart window is a window that changes transmittance for light in accordance with the intensity of a voltage. That is, a smart window serves to block radiant heat due to sunlight by reducing its transmittance when an outdoor temperature increases, and serves to increase an indoor temperature using the radiant heat from the sun by allowing the sunlight to enter an interior by increasing its transmittance when the outdoor temperature decreases.

A smart window is eco-friendly and reduces a cooling load and a heating load, thereby enabling efficient use of energy. Further, a smart window increases the quality of life of users by constructing a safe and pleasant residence and city environment. Further, a smart window is a functional alternative that can be used in various fields including not only the field of buildings, but the fields of industry (information board, exhibition of products) and traffic (sunroof).

As a smart window is spotlighted as a high-functional and high-value-added product in developed countries, such as the USA and Japan, and Europe, there are active researches for developing products using smart materials to use the products for energy-saving type intelligence buildings, windows and doors of various means of transportation, large display elements, etc. Products are being developed in the fields of an indoor partition using liquid crystal substances, automotive mirrors using electrochromic glass, etc. Further, in Korea, a fundamental study of film using liquid crystals of several materials is being conducted and studies are being conducted in institutions including laboratories.

BRIEF SUMMARY

An objective of the present disclosure is to provide a method of matching different characteristics of smart windows.

Another objective of the present disclosure is to provide a method of keeping indoor illuminance constant.

Another objective of the present disclosure is to provide a method of finely adjusting the magnitude of power that is supplied to a smart window.

Another objective of the present disclosure is to provide a method of controlling power that is supplied to a smart window in accordance with a set mode.

To this end, an indoor environment control system using smart windows of the present disclosure includes: at least two smart windows of which colors change in accordance with the intensity of supplied voltages; an internal illuminance sensor disposed inside each of the smart windows and configured to measure internal illuminance; an external illuminance sensor disposed outside each of the smart windows and configured to measure external illuminance; a main controller configured to calculate transmittance of each of the smart windows using internal illuminance and external illuminance provided from the internal illuminance sensor and the external illuminance sensor, and to calculate the intensity of a voltage that is supplied to each of the smart windows such that a difference of the calculated transmittances is a setting value (N) or less; and unit controllers configured to supply the voltages having the intensity supplied from the main controller to the smart windows, respectively.

The indoor environment control system using smart windows according to the present disclosure has an advantage in that it is possible to match the characteristics of smart windows using transmissivity calculated using illuminance measured by illuminance sensors disposed inside and outside the smart windows.

Further, according to the present disclosure, the intensity of voltages that are supplied to smart windows are finely adjusted using an algorithm, and particularly, the intensity of the voltages is adjusted within a preset range, whereby it is possible to prevent damage to the smart windows due to rapid voltage adjustment.

Further, according to the present disclosure, it is possible to maintain indoor illuminance at set illuminance using illuminance measured by illuminance sensors.

DETAILED DESCRIPTION

Aspects of the present disclosure that were described above and will be added will be made clearer through exemplary embodiments that are described with reference to the accompanying drawings. Hereafter, such embodiments of the present disclosure are described in detail so that those skilled in the art can easily understand and achieve the present disclosure.

Figure 1:
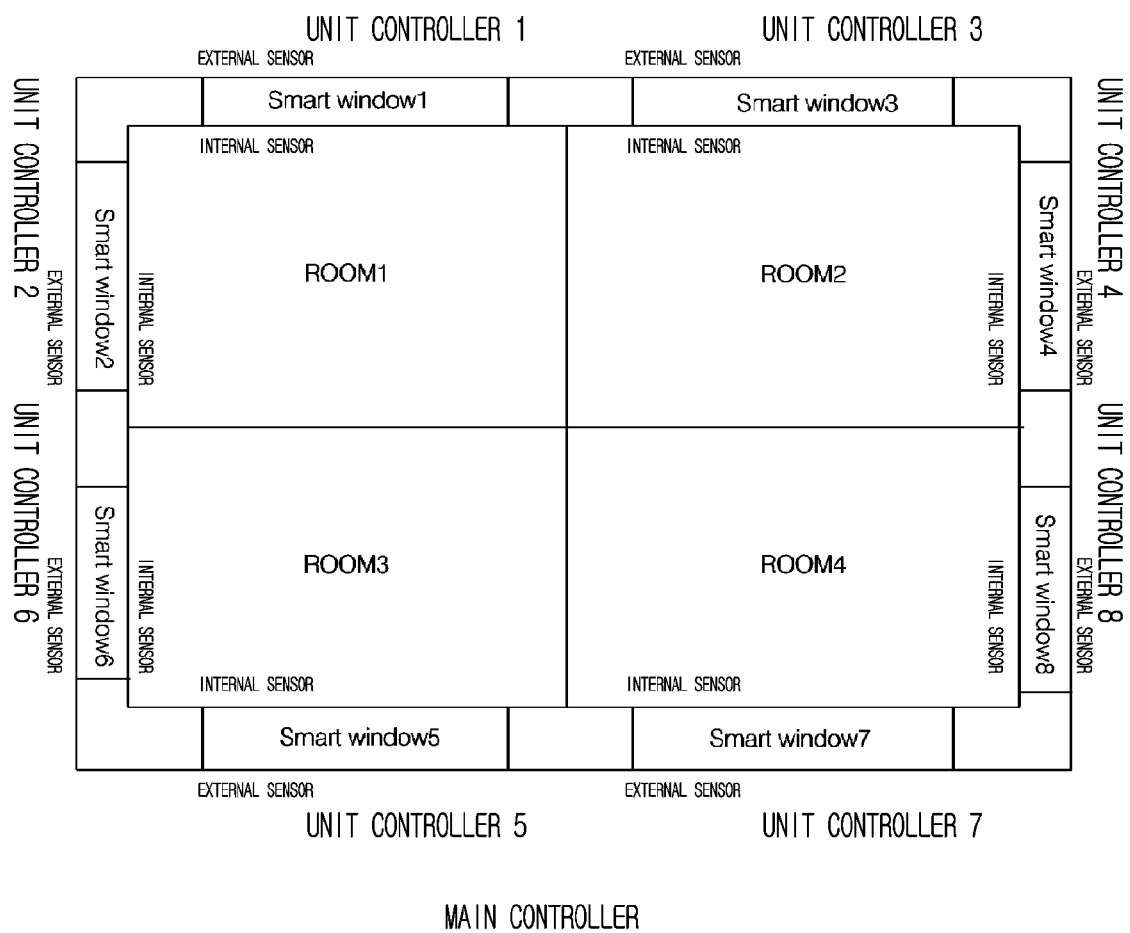
FIG. 1 shows an example in which smart windows are installed in a building according to an embodiment of the present disclosure.

FIG. 1 shows an example in which smart windows are installed in a building according to an embodiment of the present disclosure. Hereafter, an example in which smart windows are installed in a building according to an embodiment of the present disclosure is described with reference to FIG. 1.

Referring to FIG. 1, a smart window is composed of at least one smart window for each room and each of the windows includes a unit controller. The main controller that is separate from the unit controllers controls the energy usage of the entire building by adjusting the environments inside and around the building through a building energy management system (BEMS). That is, the main controller is connected with a plurality of unit controllers and controls the plurality of unit controllers.

Referring to FIG. 1, an internal illuminance sensor and an internal temperature sensor are disposed inside each smart window, and an external illuminance sensor and an external temperature sensor are disposed outside each smart window. As described above, the present disclosure includes an internal illuminance sensor that measures the illuminance inside a smart window and an internal temperature sensor that measures the temperature inside a smart window, and an external illuminance sensor that measures the illuminance outside a smart window and an external temperature sensor that measures the temperature outside a smart window.

Figure 2:
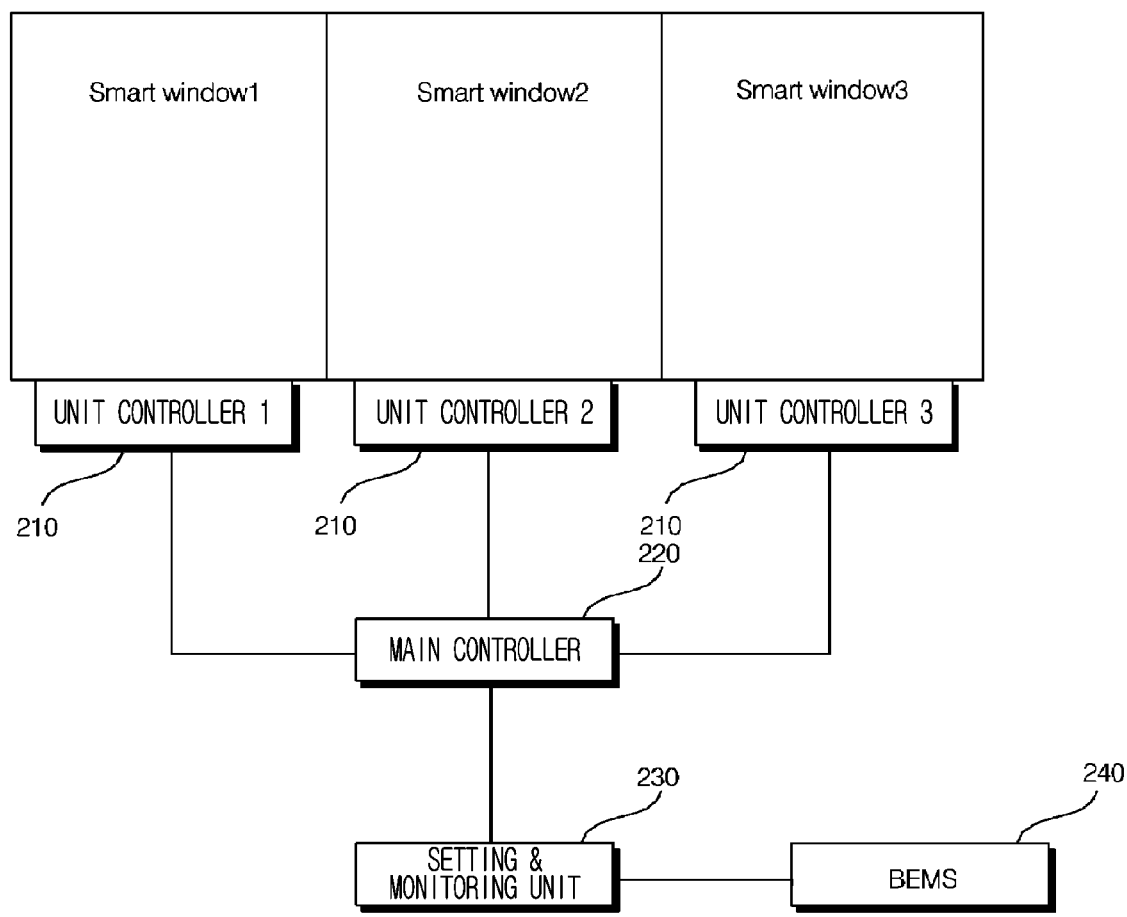
FIG. 2 shows an indoor environment control system according to an embodiment of the present disclosure.

FIG. 2 shows an indoor environment control system according to an embodiment of the present disclosure. Hereafter, the configuration of an indoor environment control system according to an embodiment of the present disclosure is described in detail with reference to FIG. 2.

Referring to FIG. 2, an indoor environment control system 200 includes a unit controller 210, a main controller 220, a setting & monitoring unit 230, and a BEMS 240. Of course, components may be included in the indoor environment control system proposed herein other than the components described above.

Referring to FIG. 2, a unit controller 210 is provided for each smart window, and a plurality of unit controllers 210 positioned in a specific direction is connected to the main controller 220. The main controller 220, as described above, is connected to an internal illuminance sensor, an external illuminance sensor, an internal temperature sensor, and an external temperature sensor, and is provided with illuminance and temperature measured by each of the sensors.

The unit controller 210 controls the intensity of a current that is supplied to each smart window in accordance with a control instruction of the main controller 220. The unit controllers 210 supply voltages (currents) having different intensity to the smart windows in accordance with the characteristics of the smart windows that are provided from the main controller 220.

The setting & monitoring unit 230 is connected to the main controller 220 and sets voltages that are supplied to the smart windows. That is, the colors of the smart windows in accordance with the intensity of the voltages that are supplied to the windows. In the present disclosure, the setting & monitoring unit 230 sets the voltages that are supplied to the smart windows as voltages that are supplied in accordance with set modes, and the unit controllers 210 finely adjust and supply the voltages set by the setting & monitoring unit 230 in accordance with the characteristics of the smart windows that are provided from the main controller. That is, the unit controllers 210 control the finely adjusted voltages to be provided to the smart windows. In other words, the unit controllers 210 finely control and supply voltages that are supplied to the smart windows such that a difference in color according to the inherent characteristics of the smart window is not generated.

The BEMS 240 is connected to the setting & monitoring unit 230 and manages not only the smart windows, but cooling/heating of the building and other general states of the building.

Figure 3:
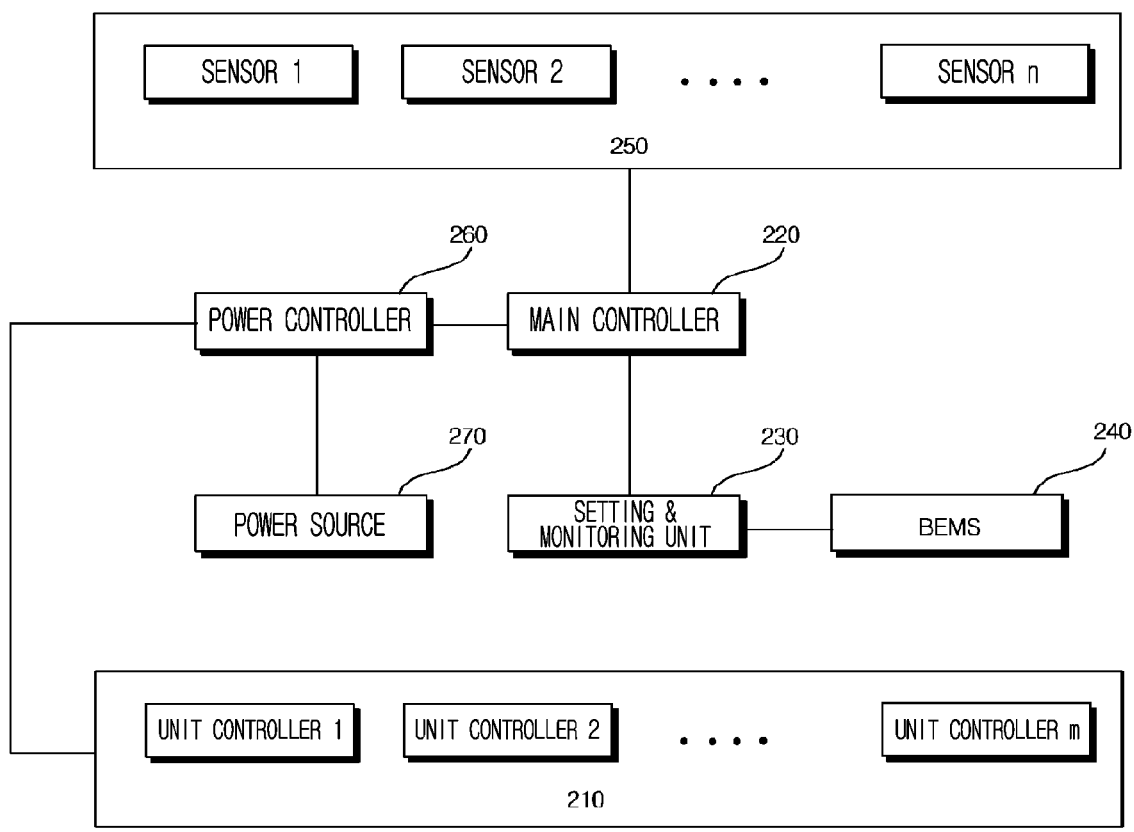
FIG. 3 shows another configuration of an indoor environment control system according to an embodiment of the present disclosure.

FIG. 3 shows another configuration of an indoor environment control system according to an embodiment of the present disclosure. Hereafter, another configuration of an indoor environment control system according to an embodiment of the present disclosure is described in detail with reference to FIG. 3.

Referring to FIG. 3, an indoor environment control system 200 includes a plurality of sensors 250, a main controller 220, a power controller 260, unit controllers 210, a power source 270, and a setting & monitoring unit 230. Of course, components may be included in the indoor environment control system proposed herein other than the components described above.

The sensors 250, as described above, include an illuminance sensor or a temperature sensor, and measure indoor or outdoor illuminance or temperature. The sensors 250 provide measured illuminance or temperature to the main controller 220 in a wired or wireless type. For example, the sensors 250 provide illuminance or temperature to the main controller 220 using communication of Bluetooth, Zigbee, RS485, or RS232.

The main controller 220 finds out the characteristics of smart windows using the illuminance or temperature provided from the sensors, and controls the intensity of currents that are supplied to the smart windows in accordance with the found characteristics. The reason that the main controller 220 finds out the characteristics of smart windows will be described below.

The main controller 220 provides information about the found characteristics of smart windows to the setting & monitoring unit 230. The main controller 220 provides information about the characteristics of smart windows to the setting & monitoring unit 230 using any one communication of Ethernet, RS232, or RS485.

The power source 270 supplies power to the system, and particularly, supplies power to smart windows.

The power controller 260 supplies power to smart windows in accordance with the characteristics of the smart windows found out by the main controller 220.

The unit controllers 210 are controlled to supply power (currents) to the smart windows by the main controller 260. As described above, according to the present disclosure, power that is supplied to smart windows by the power controller is controlled in accordance with the characteristics of the smart windows measured by the main controller 220.

As described above, an illuminance sensor and a temperature sensor are installed inside and outside each smart window. The illuminance sensor and the temperature sensor measure the environments inside and outside the building and provide measure environment information to the main controller.

The illuminance sensors installed inside and outside each smart window are installed in the same direction and measure illuminance or transmittance inside and outside the building. That is, the transmittance of a smart window is calculated using an internal illuminance sensor value/external illuminance sensor value.

In general, differences are generated in smart windows, depending on the production LOT and elapse of color operation time of the windows. Even though the same value is set in unit controllers, a difference is generated in transmittance due to such differences, which results in a visual difference.

The system further includes a manager terminal (not shown). The manager terminal updates modes set in the setting & monitoring unit 230, and sets data using an installed application.

According to the present disclosure, in order to reduce such differences, the main controller gives an instruction to finely change a voltage to unit controllers connected to smart windows, respectively, such that transmittances calculated from illuminance measured by illuminance sensors are the same. Such a series of operations and measurement values are continuously provided to the setting & monitoring unit connected to the BEMS and data are accumulated, whereby a database DB is constructed.

Through this method, it is possible to set the appropriate temperature and illuminance for each room or season. As shown in FIG. 1, it is required to separately control temperature and illuminance for Room 1 to Room 4 on the same floor in accordance with a user environment.

The main controller can set a manual mode, an auto mode, and a schedule mode and control each work or living space in these modes. For example, transmissivity is decreased to minimize heat transfer to the outside and a lighting device having high energy efficiency is used in summer, and transmissivity is adjusted with illuminance appropriately maintained in a work space in winter. Alternatively, it is possible to change transmissivity in the unit of day or hour. It is possible to change transmissivity for each mode using a mobile application through the setting & monitoring unit.

Figure 4:
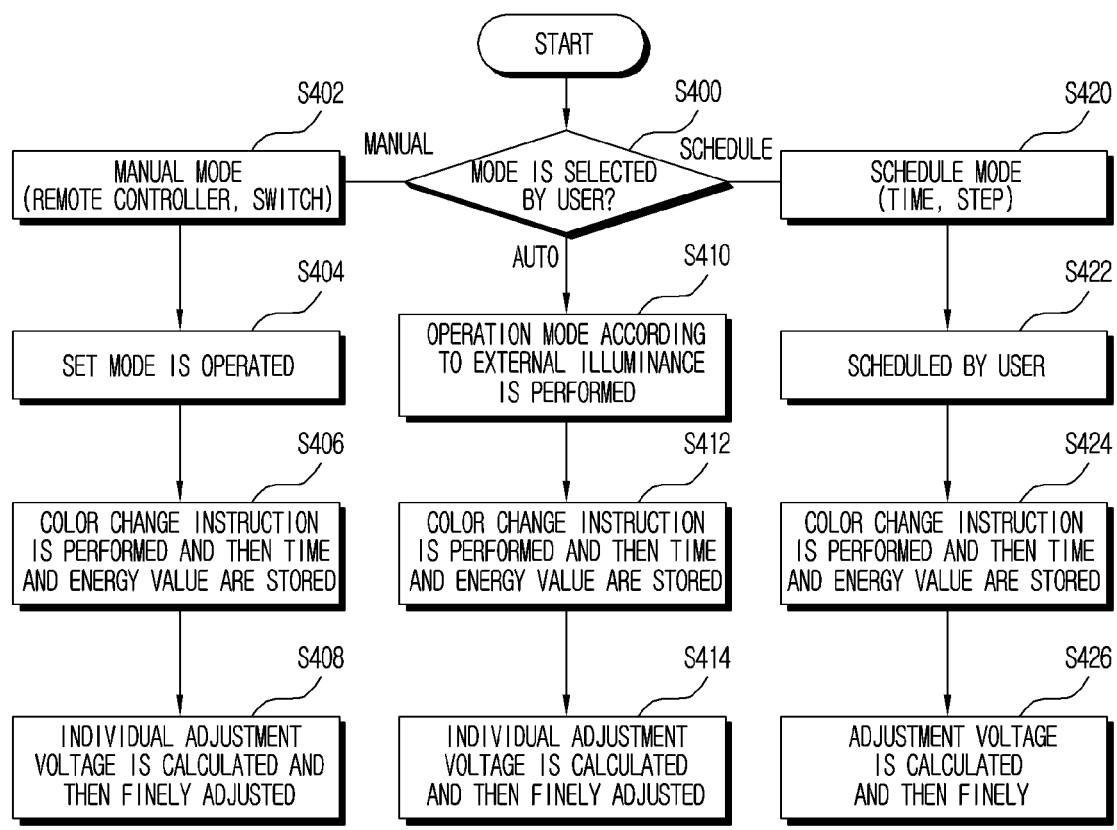
FIG. 4 is a flowchart showing a process of setting each mode according to an embodiment of the present disclosure.

FIG. 4 is a flowchart showing a process of setting each mode according to an embodiment of the present disclosure. Hereafter, a process of setting each mode according to an embodiment of the present disclosure is described in detail with reference to FIG. 4. In particular, FIG. 4 shows the operations that are performed by the main controller or the setting & monitoring unit.

Referring to FIG. 4, in step S400, a user selects any one mode from three modes. As described above, the three modes are a manual mode, an auto mode, and a schedule mode, and other modes may be included. The manual mode is a mode in which when a user selects any one of level 1 to level n (n is an integer of 2 or more), the system is operated in accordance with the selected mode, and the schedule mode is a mode in which when a level is set for each of specific time, the system is operated at each of the time in accordance with the levels. The auto mode is a mode in which when the manual mode or the schedule mode is not selected, the system is operated using internal illuminance, external illuminance, and an algorithm. That is, according to the present disclosure, the manual mode and the schedule mode do not use illuminance or temperature provided from sensors, but the auto mode uses illuminances or temperatures provided from sensors. Hereafter, the manual mode is described first, and then the auto mode and the schedule mode are described.

In step S402, the main controller enters the manual mode through a remote controller or a switch.

In step S404, the main controller operates in the manual mode in accordance with a manual mode entry request.

In step S406, a color change instruction is performed to correspond to the set manual mode, and if necessary, the time for which the color change instruction was performed and energy (current, voltage) are stored.

In step S408, the main controller controls unit controllers to finely adjust voltages after calculating separately adjusted voltages.

In step S410, the main controller enters the auto mode and performs in accordance with external illuminance in the auto mode.

In step S412, a color change instruction is performed to correspond to the set auto mode, and if necessary, the time for which the color change instruction was performed and energy (current, voltage) are stored.

In step S414, the main controller controls unit controllers to adjust voltages after calculating separate adjusted voltages.

In step S420, the main controller enters the schedule mode.

In step S422, the main controller performs the user schedule mode.

In step S424, a color change instruction is performed to correspond to the set schedule mode, and if necessary, the time for which the color change instruction was performed and energy (current, voltage) are stored.

In step 426, the main controller controls unit controllers to adjust voltages after calculating separate adjusted voltages.

The fine adjustment algorithm of the main controller is as follows.

The main controller reduces the differences of smart windows receiving the same instruction (auto, manual, and schedule level 1 to level n) with similar external illuminance.

The main controller checks transmittance of adjacent smart windows having the same instruction and similar external illuminance after color change is finished.

The main controller performs fine operation through the algorithm when the standard difference of illuminance is N or more (N is a minimum difference from which a user feels that there is a problem with the color of a smart window and is generally determined through tests, and for example, when illuminance difference is 3%, a user may feel that there is a problem with a color).

The main controller is provided with transmittance of each smart window and calculates average transmittance of the smart windows. The main controller adjusts voltages that are supplied to the smart windows, respectively, such that the transmittance of each of the smart window comes close to the average transmittance.

That is, the main controller performs fine operation, as follows, and particularly, adjusts voltages Vec that are supplied to the smart windows. When a voltage Vec is higher than an average voltage Vec, the voltage Vec is decreased, when the voltage Vec is lower than the average voltage, the voltage Vec is increased. When x≤voltage (Vec)≤y, Vm is x or more and y or less. In this case, x is a number smaller than 0 and y is a number larger than 0. For example, when x is −1 and y is 2, Vm that is the adjusted voltage has a value between −1 and 2. In this case, Vec means the intensity of the voltage that is supplied to each of the smart windows and Vm means the intensity of the adjusted voltage.

Hereafter, the mounting positions of illuminance sensors are described. In the present disclosure, illuminance sensors disposed at different positions on smart windows.

Figure 5:
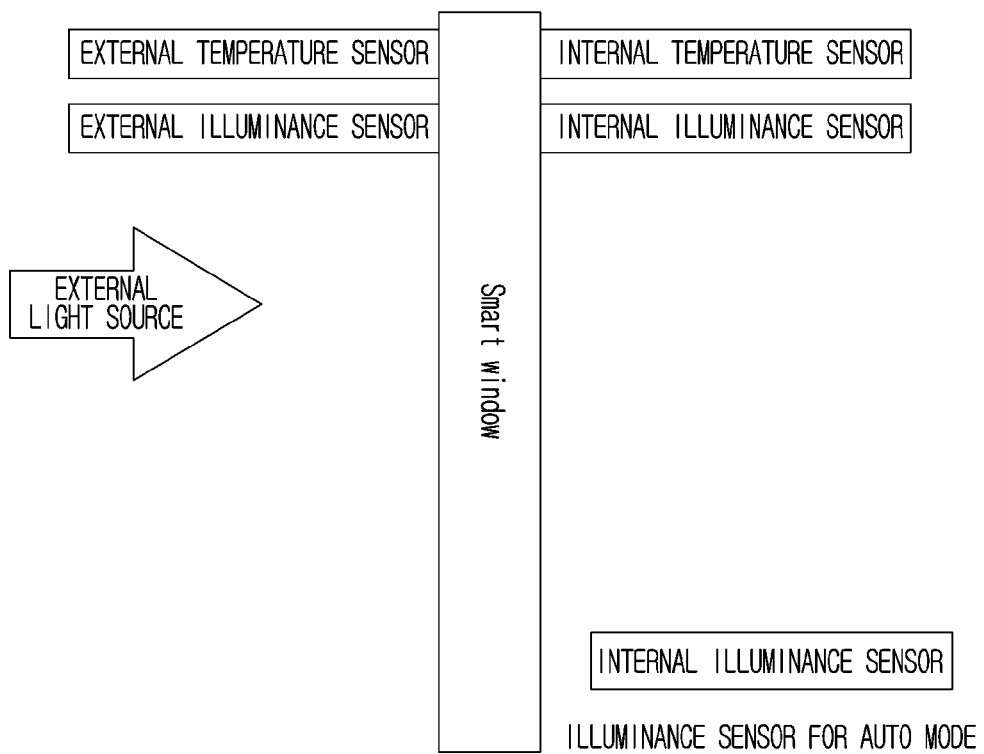
FIG. 5 shows an example in which sensors are mounted on a smart window according to an embodiment of the present disclosure.
Figure 5:
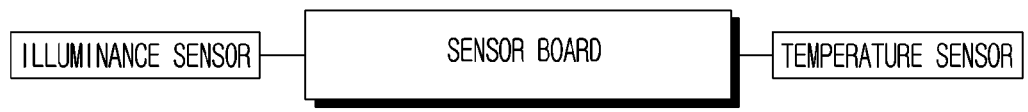

FIG. 5 shows an example in which sensors are mounted on a smart window according to an embodiment of the present disclosure. Hereafter, an example in which sensors are mounted on smart windows according to an embodiment of the present disclosure is described with reference to FIG. 5.

Referring to FIG. 5, an external temperature sensor and an external illuminance sensor are disposed at a side (outer side) of a smart window, and an internal illuminance sensor is disposed at another side (inner side). The external temperature sensor and the external illuminance sensor are in close contact with the smart window, but the internal illuminance sensor is spaced a predetermined distance from the smart window.

The external illuminance sensor is disposed at a point that is relatively the brightest and is mounted perpendicular to a building (the smart window).

The internal illuminance sensor may be disposed at various positions, as shown in FIG. 5, which may depend in the position and height of the smart window or the season though. The external illuminance sensor and the internal illuminance sensor are designed to face the same direction at positions corresponding to each other with the smart window therebetween (on both sides of the smart window). Accordingly, it is possible to calculate relatively accurately transmissivity. Further, an illuminance sensor that is operated in an auto mode is additionally provided and installed to face the ceiling at a position that can represent illuminance of the entire room.

In the present disclosure, external illuminance and internal illuminance of smart windows are collected and then the transmittance of the smart windows is determined in accordance with each set brightness, and the main controller adjusts the transmittance, whereby a color change of the smart windows and fine adjustment are automatically performed on the basis of the algorithm.

Further, as shown in FIG. 5, a sensor board is connected to an illuminance sensor and a temperature sensor, and includes a communication module therein. The communication module provides illuminance and temperature measured by the illuminance sensor and the temperature sensor to the main controller using Zigbee wireless communication. The main controller stores the transmitted illuminance and temperature in the setting & monitoring unit through Ethernet communication and the setting & monitoring unit displays the transmitted illuminance and temperature through a display and displays other information calculated by the algorithm.

Hereafter, a method of adjusting a voltage that is supplied to a smart window by the main controller is described.

The auto mode is a mode in which indoor illuminance is maintained at a constant level without external input.

Vec is determined in accordance with external illuminance.

When it is the target to maintain indoor illuminance at A±B, the indoor illuminance should be (A−B) to (A+B).

In this case, the targeted indoor illuminance and the current indoor illuminance of the interior are checked, and a voltage that is supplied to a smart window is adjusted.

When indoor illuminance is less than (A−B), a process of decreasing Vec is repeatedly performed, and when indoor illuminance exceeds (A+B), a process of increasing Vec is repeatedly performed such that the indoor illuminance comes into a targeted illuminance range.

The intensity of a voltage to be finely adjusted depends on the difference between the current indoor illuminance and the targeted indoor illuminance. When the difference between the current indoor illuminance and the targeted indoor illuminance is a or more, the intensity of a voltage that is adjusted is a', and the difference between the current indoor illuminance and the targeted indoor illuminance is less than a and b or more, the intensity of a voltage that is adjusted is b'. When the difference between the current indoor illuminance and the targeted indoor illuminance is less than b, the intensity of a voltage that is adjusted is c'. In this case, a is larger than b and b' is smaller than a' and larger than c'.

Hereafter, a method of adjusting differences between smart windows is described. A method of adjusting differences between smart windows is applied to the manual mode, the auto mode, and the schedule mode.

Transmittance is K* (internal illuminance sensor value/external illuminance sensor value) and K is a value set (input) by a manager as a correction value according to the position of a sensor.

The main controller is provided with internal illuminance values and external illuminance values from sensors of at least two smart windows receiving the same instruction, and calculates transmittance of the smart windows.

The main controller calculates the standard difference of the calculated transmittances, and determines whether the calculated standard difference exceeds N that is a setting value. When the calculated standard difference does not exceed N, the main controller supplies the existing voltage, which has the intensity that is being supplied, to the smart windows.

When the calculated standard difference exceeds N, the main controller adjust the voltages that are supplied to the smart windows. When a voltage Vec that is supplied to a specific smart window is higher than an average voltage Vec, the voltage Vec that is supplied to the smart window is decreased, when the voltage Vec is lower than the average voltage, the voltage Vec is increased. In this case, even though the calculated standard difference exceeds N, all of the voltages that are supplied to the smart windows are not adjusted, and the voltage that is supplied to the smart window in which the standard difference exceeds N is adjusted.

When x≤voltage (Vec)≤y, Vm is x or more and y or less. In this case, x is a number smaller than 0 and y is a number larger than 0, and these are set values. For example, when x is −1 and y is 2, Vm that is the adjusted voltage has a value between −1 and 2.

The main controller repeats the processes described above such that the standard difference does not exceed N.

As described above, the present disclosure proposes a method of matching inherent characteristics of smart windows.

Although the present disclosure has been described with reference to the exemplary embodiments illustrated in the drawings, those are only examples and may be changed and modified into other equivalent exemplary embodiments from the present disclosure by those skilled in the art.

The present disclosure relates to an indoor environment control system using a smart window, in more detail, a system for controlling an indoor environment by matching different characteristics of smart windows.

The indoor environment control system using smart windows according to the present disclosure has an advantage that it is possible to match the characteristics of smart windows using transmissivity calculated using illuminance measured by illuminance sensors disposed inside and outside the smart windows.

The invention claimed is:

1. An indoor environment control system using smart windows, the indoor environment control system comprising:
   at least two adjacent smart windows of which colors change in accordance with intensities of supplied voltages;
   at least two internal illuminance sensors, each internal illuminance sensor disposed inside a respective smart window and configured to measure an internal illuminance corresponding to the respective smart window;
   at least two external illuminance sensors, each external illuminance sensor disposed outside a respective smart window and configured to measure an external illuminance corresponding to the respective smart window;

a main controller configured to:
- calculate transmittances of each of the adjacent smart windows based on internal illuminances and external illuminances provided from the internal illuminance sensors and the external illuminance sensors, and
- calculate a difference of between the calculated transmittances of the at least two adjacent smart windows, and
- calculate intensities of voltages to be supplied to each of the at least two adjacent smart windows such that a difference between the calculated transmittances of the at least two adjacent smart windows is a setting value (N) or less than the setting value (N); and unit controllers configured to supply the calculated voltages having the intensities supplied from the main controller to each of the at least two adjacent smart windows, respectively.

2. The indoor environment control system of claim 1, wherein the main controller calculates a standard difference of the calculated transmittances of the at least two adjacent smart windows, and when the calculated standard difference exceeds the setting value (N), the main controller adjusts the intensity of a voltage, which is supplied to a smart window in which the standard difference exceeds the setting value (N), by Vm that is an adjustment voltage, wherein Vm is x or more and y or less, the x is smaller than 0, and y is larger than 0.

3. The indoor environment control system of claim 2, comprising a setting & monitoring unit configured to monitor the intensity of the voltages that are supplied to the at least two adjacent smart windows, provide information about the intensity of the voltages that are supplied to the at least two adjacent smart windows from the main controller to a building energy management system (BEMS) at the outside, and having initial voltages set to be supplied to the at least two adjacent smart windows in accordance with a setting mode.

4. The indoor environment control system of claim 1, wherein the main controller controls the unit controllers to supply voltages to the at least two adjacent smart windows in any one of a manual mode, a schedule mode, and an auto mode, and
- the manual mode is a mode that is operated in accordance with a level selected by level 1 to level 4 having different intensity input by a user, the schedule mode is a mode in which when a level is set for each of specific times, the levels are performed at the times, and the auto mode is a mode that is operated using internal illuminance, external illuminance, and an algorithm when the manual mode or the schedule mode is not selected.

5. The indoor environment control system of claim 4, wherein the auto mode adjusts the intensity of the voltages that are supplied to the at least two adjacent smart windows when target indoor illuminance and internal illuminance sensed by the internal illuminance sensor are different, wherein Vm that is an adjusted voltage is x or more and y or less, x is smaller than 0, and y is larger than 0.

* * * * *